United States Patent
Kuechenmeister et al.

(10) Patent No.: US 6,787,713 B2
(45) Date of Patent: Sep. 7, 2004

(54) LOAD CELL AND WEIGHING SYSTEM FOR CRYOGENIC TANKS

(75) Inventors: Robert Kuechenmeister, St. Paul, MN (US); Greg Voss, Lakeville, MN (US)

(73) Assignee: Chart Inc., Burnsville, MN (US)

( * ) Notice: Subject to any disclaimer, the term of this patent is extended or adjusted under 35 U.S.C. 154(b) by 31 days.

(21) Appl. No.: 10/207,403

(22) Filed: Jul. 29, 2002

(65) Prior Publication Data

US 2004/0016576 A1 Jan. 29, 2004

(51) Int. Cl.⁷ .................... G01G 19/52; G01F 23/20
(52) U.S. Cl. .............. 177/132; 177/142; 177/143; 177/DIG. 9; 177/244; 73/296
(58) Field of Search .................. 177/132, 142, 177/143, DIG. 9, 238–244; 73/296

(56) References Cited

U.S. PATENT DOCUMENTS

| | | | |
|---|---|---|---|
| 2,709,790 A | 5/1955 | Swanson | 177/211 |
| 2,980,414 A | 4/1961 | Perry, Jr. et al. | 177/211 |
| 3,072,209 A | 1/1963 | Perry, Jr. | 177/179 |
| 3,472,329 A * | 10/1969 | Smith | 177/211 |
| 4,004,647 A * | 1/1977 | Forst et al. | 177/128 |
| 4,044,920 A | 8/1977 | Swartzendruber | 222/58 |
| 4,219,091 A * | 8/1980 | Kleinhans | 177/211 |
| 4,363,408 A * | 12/1982 | O'Brien et al. | 209/546 |
| 4,407,160 A | 10/1983 | van de Velde | 73/296 |
| 4,683,921 A | 8/1987 | Neeser | 141/1 |
| 4,969,112 A * | 11/1990 | Castle | 702/173 |
| 4,986,376 A * | 1/1991 | Cone | 177/128 |
| 5,174,354 A | 12/1992 | Neeser et al. | 141/5 |
| 5,234,035 A | 8/1993 | Neeser | 141/1 |
| 5,294,756 A * | 3/1994 | Lauber et al. | 177/119 |
| 5,313,022 A * | 5/1994 | Piroozmandi et al. | 177/211 |
| 5,770,823 A * | 6/1998 | Piroozmandi | 177/1 |
| 5,850,757 A | 12/1998 | Wierenga | 73/296 |
| 6,148,667 A | 11/2000 | Johnson | 73/296 |
| 6,172,309 B1 | 1/2001 | Lockery | 177/211 |
| 6,225,576 B1 | 5/2001 | Poole et al. | 177/211 |
| 6,320,142 B1 * | 11/2001 | Burton et al. | 177/132 |
| 6,555,765 B2 * | 4/2003 | Paine | 177/142 |
| 6,596,949 B2 * | 7/2003 | Stimpson | 177/142 |
| 2001/0011609 A1 | 8/2001 | Rudolph | 177/245 |

* cited by examiner

Primary Examiner—Randy W. Gibson
(74) Attorney, Agent, or Firm—Piper Rudnick LLP

(57) ABSTRACT

A load cell and system for detecting the quantity of liquid carbon dioxide in a tank includes load cells positioned between the legs of the tank and a surface. Each load cell includes a frame constructed from a folded metal plate so that a top panel, sides and ends are formed. A beam having proximal and distal ends is suspended from the top panel of the frame by its proximal end and a spacer. A platform support is positioned upon the distal end of the beam with a platform on top. The platform support passes through an opening formed in the top panel of the frame so that the platform is supported above the frame top panel. A leg of the tank is secured to the platform. A strain gauge circuit is mounted to the top surface of the beam and a summary board receives the signals from the strain gauge circuits of multiple load cells so that the quantity of liquid in the tank is determined. This quantity may be displayed and/or transmitted as telemetry to a centralized delivery truck dispatching facility.

23 Claims, 3 Drawing Sheets

LOAD CELL AND WEIGHING SYSTEM FOR CRYOGENIC TANKS

BACKGROUND OF THE INVENTION

The invention relates generally to strain gauge load cells for weighing and, more particularly, to an improved load cell and system for determining the liquid quantity in cryogenic tanks or cylinders.

Cryogenic liquids stored in tanks are used in a variety of industries. For example, it is known in the restaurant industry to have carbonated beverage dispensing systems wherein gaseous carbon dioxide is mixed with syrup, and sometimes water, to produce a desired carbonated beverage. The syrup, water and carbon dioxide are stored in separate containers with the carbon dioxide stored in liquid form in cylinders or tanks for space efficiency purposes. The liquid carbon dioxide and syrup tanks are periodically refilled by delivery trucks. Examples of such systems may be found in U.S. Pat. Nos. 4,683,921 and 5,234,035, both to Neeser, and U.S. Pat. No. 5,174,354 to Neeser at al.

Clearly it is necessary to check the liquid level of a liquid carbon dioxide tank to determine if the tank need to be replenished. One way to do this is to mount the liquid carbon dioxide tank on a scale. The weight of the tank is subtracted from the weight indicated by the scale to obtain the weight, and thus the quantity, of the liquid carbon dioxide in the tank. Such scales typically include a single load cell centrally positioned between two horizontal and parallel plates that form the framework of the scale. The top plate forms a platform to which the tank legs are bolted. The bottom plate is usually bolted to the floor of the restaurant or other establishment.

A shear beam load cell is often used in a scale for weighing tanks and includes a rectangular beam of load cell quality metal alloy which has one end arranged to be supported on a base in cantilever fashion and a free end arranged to support a vertical load. Strain gauges are mounted to the top and/or bottom of the beam between the supported end and the loaded end. The portion of the beam in the vicinity of the strain gauges may be hollowed out or formed into a web so that the stress on the loaded beam is focused in the area where the strain gauges are mounted. This increases the accuracy of the load cell.

The strain gauges typically consist of thin film or metal foil strain gauge circuits that are mounted to the beam by a glueing process. The basic principle is that a wire or other conductor changes its electrical resistance when deformed. An electric current is passed through the strain gauge circuit. The resistance of the strain gauge changes as the surface to which it is mounted (the top or bottom of the beam) strains or is deformed. Since the strain gauge is bonded throughout its entire length, the gauge is able to sense compressive or tensile strain or deformation of the beam. The resistance change of the strain gauge is proportional to the strain or deformation, as measured by appropriate instruments.

A problem with scales featuring a single load cell in the center is that the mounting surface has to be relatively level for the scale to produce accurate readings. In addition, the mounting of the tank to the top platform and the bottom platform to the floor has to be very rigid or else rocking of the tank upon the single load cell will occur. Such rocking would also adversely effect the accuracy of the scale as well as the stability of the tank mounting.

As an alternative to scale systems that use single load cells, container weighing systems wherein multiple load cells are used have been developed. In such systems, a number of strain gauge load cells are positioned between the legs of the tank and the surface to which the tank is mounted. As a result, the weight of the container and its contents is supported by the load cells. The load cells are connected to summing and calibration circuitry which provides an output to a display from which the weight of the contents of the container may be obtained. Examples of such systems are presented in U.S. Pat. No. 2,980,414 to Perry et al., U.S. Pat. No. 4,044,920 to Swartzendruber and U.S. Pat. No. 4,407,160 to van de Velde. None of the these references, however, illustrate a system for determining the weight of tanks filled with cryogenic liquids.

In addition, the load cells used by prior art weighing systems suffer from a number of disadvantages. More specifically, their complexity makes them expensive to manufacture and may pose maintenance and reliability issues. In addition, prior art load cells feature beams that are supported on the bottom side and support loads on the top side. Such an arrangement makes the prior art load cells difficult to clean under. This can be a significant disadvantage in the restaurant or food service industry.

Accordingly, it is an object of the present invention to provide a load cell and weighing system that can measure the amount of liquid in a tank accurately.

It is another object of the present invention to provide a load cell and weighing system that is easy to install.

It is another object of the present invention to provide a load cell and weighing system that supports a tank in a stable and secure fashion.

It is still another object of the present invention to provide a load cell and weighing system that is economical to manufacture and requires minimal maintenance.

It is still another object of the present invention to provide a load cell that permits cleaning underneath.

SUMMARY OF THE INVENTION

The present invention is directed a load cell and a system for determining the quantity of a liquid, such as liquid carbon dioxide, in a tank having a number of legs. A dedicated load cell is position under each leg of the tank. Alternatively, an active load cell may be placed under one leg of the tank with dummy load cells placed under the remaining legs.

Each load cell includes a frame constructed from a metal plate that is folded so that a top panel, sides and ends are formed. The frame is adapted to be positioned on a surface with the top panel spaced from the surface. A beam having a distal end portion and a proximal end portion is suspended by its proximal end portion from the top panel of the frame with a spacer therebetween. The distal end of the beam is provided with a platform support that passes through an opening formed in the top panel of the frame and a platform is mounted on top of the platform support. Each platform is adapted to receive one of the legs of the tank so that a number of the load cells support the tank. A strain gauge circuit is attached to the top surface of each load cell beam between the proximal and distal end portions.

The strain gauge circuits of the load cells communicate with a summing and calibration circuit or a summary board. The summary board processes and combines the signals from the load cells so that the quantity of liquid carbon dioxide in the tank may be determined. The output of the summary board may be directed to a display device and/or a transmitter that is in communication with an antenna so that the quantity of liquid carbon dioxide in the tank may be transmitted to a centralized facility as telemetry. The centralized facility, which may receive telemetry from a number of remote tank locations, dispatches a delivery truck to refill the tank based upon the liquid quantity information received.

The following detailed description of embodiments of the invention, taken in conjunction with the appended claims and accompanying drawings, provide a more complete understanding of the nature and scope of the invention.

DESCRIPTION OF THE PREFERRED EMBODIMENTS

It should be noted that while the invention is described below in terms of use with a storage tank for liquid carbon dioxide, the load cell and system may be used to measure liquid quantities in tanks storing other types of liquids, both of the cryogenic and non-cryogenic variety.

Figure 1:
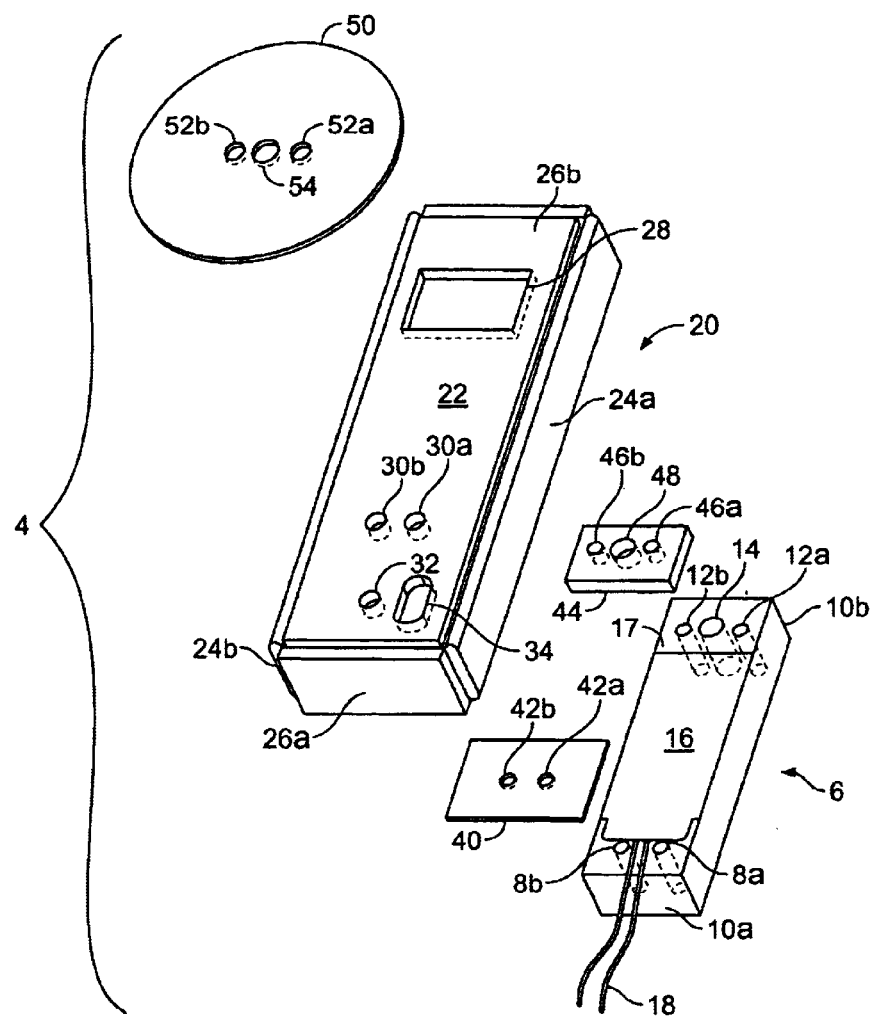
FIG. 1 is an exploded view of an embodiment of the load cell of the present invention.

An exploded view of an embodiment of the load cell of the present invention is illustrated at 4 in FIG. 1. The load cell is a shear beam load cell and includes a rectangular beam, indicated in general at 6, constructed of load cell quality metal such as aluminum, steel or stainless steel alloy. A pair of frame-mount holes 8a and 8b pass through the beam near the proximal end portion 10a of the beam while a pair of platform-mount holes 12a and 12b pass through the beam near its distal end portion 10b. A tank-mount hole 14 passes through the beam and is positioned between the platform mount holes 12a and 12b.

A strain gauge circuit, indicated at 16, is mounted to the top surface 17 of the rectangular beam 6 by glueing or other attachment methods known in the art. As will be explained in greater detail below, the circuit offers differing resistance levels depending upon the load that is placed upon the rectangular beam 6. The strain gauge circuit may be of the foil or thin film variety. Suitable strain gauge circuits are well known in the art. The strain gauge circuit 16 receives an electric current and communicates with a summary board via wires 18.

The load cell 4 also includes a frame, indicated in general at 20, which is constructed essentially of a metal plate folded into a rectangular box configuration so that a top panel 22, sides 24a and 24b and ends 26a and 26b are formed. An opening 28 is formed in the top panel 22 of the frame 20. A pair of beam-mount holes 30a and 30b are also formed through the top panel 22 as are floor-mount hole 32 and wire hole 34.

In addition to the beam 6 and body 20, the load cell includes a spacer 40 having a pair of holes 42a and 42b, a platform support 44 having holes 46a, 46b and, 48 and a circular platform 50 having holes 52a, 52b and 54. As will be described below, these components allow the beam 6 to be mounted within the frame 20 in a cantilever fashion with the platform mounted to the distal end portion of the beam.

Figure 2:
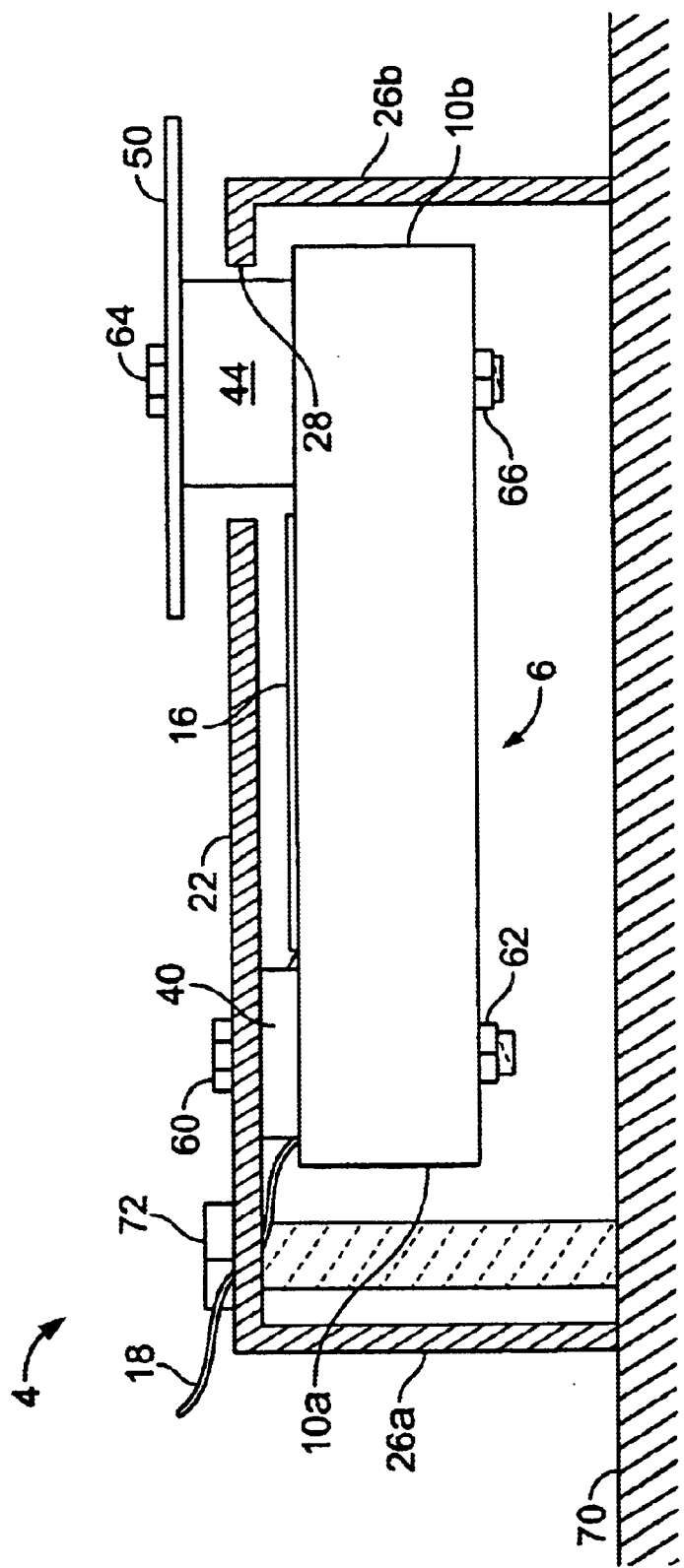
FIG. 2 is a sectional view of the load cell of FIG. 1 after assembly.

The assembled load cell is indicated in general at 4 in FIG. 2. As illustrated in FIG. 2, the proximal end portion 10a of the beam 6 is bolted through the spacer 40 to the top panel 22 of the frame by bolts 60 that pass through holes 30a, 30b, 42a, 42b and 8a and 8b (FIG. 1) and engage nuts 62. Platform 50 is secured to the proximal end portion 10b of beam 6 through support 44 via bolts 64 that pass through holes 52a, 52b, 46a, 46b and 12a and 12b (FIG. 1) and engage nuts 66. The support 44 passes through opening 28 of the frame 20. As such, the beam 6 is mounted within the frame 20 in a cantilever beam fashion.

The assembled load cell 4 is secured to a surface 70, such as the floor of a restaurant kitchen, by a bolt 72 that passes through the floor-mount hole 32 (FIG. 1) formed through the top panel 22 of the frame. The threads of the bolt 72 engage a hole bored in the surface 72. The ends 26a and 26b of the frame and sides 24a and 24b (FIG. 1) act as legs to support the frame top panel, and suspended beam 6, above the surface 70. The wires 18 for the strain gauge circuit 16 pass through hole 34 (FIG. 1). It should be noted that other arrangements known in the art may be used to secure the load cell 4 to the surface 70 in place of bolt 72.

In operation, an object to be weighed is placed upon platform 50. As a result, the beam 6 deflects and the resistance in strain gauge circuit 16 changes to reflect this deflection. An electrical device, such as a summary board or summing and calibration circuitry, communicates with the strain gauge circuit 16 via wires 18 so as to detect the weight of the object placed on platform 50.

Figure 3:
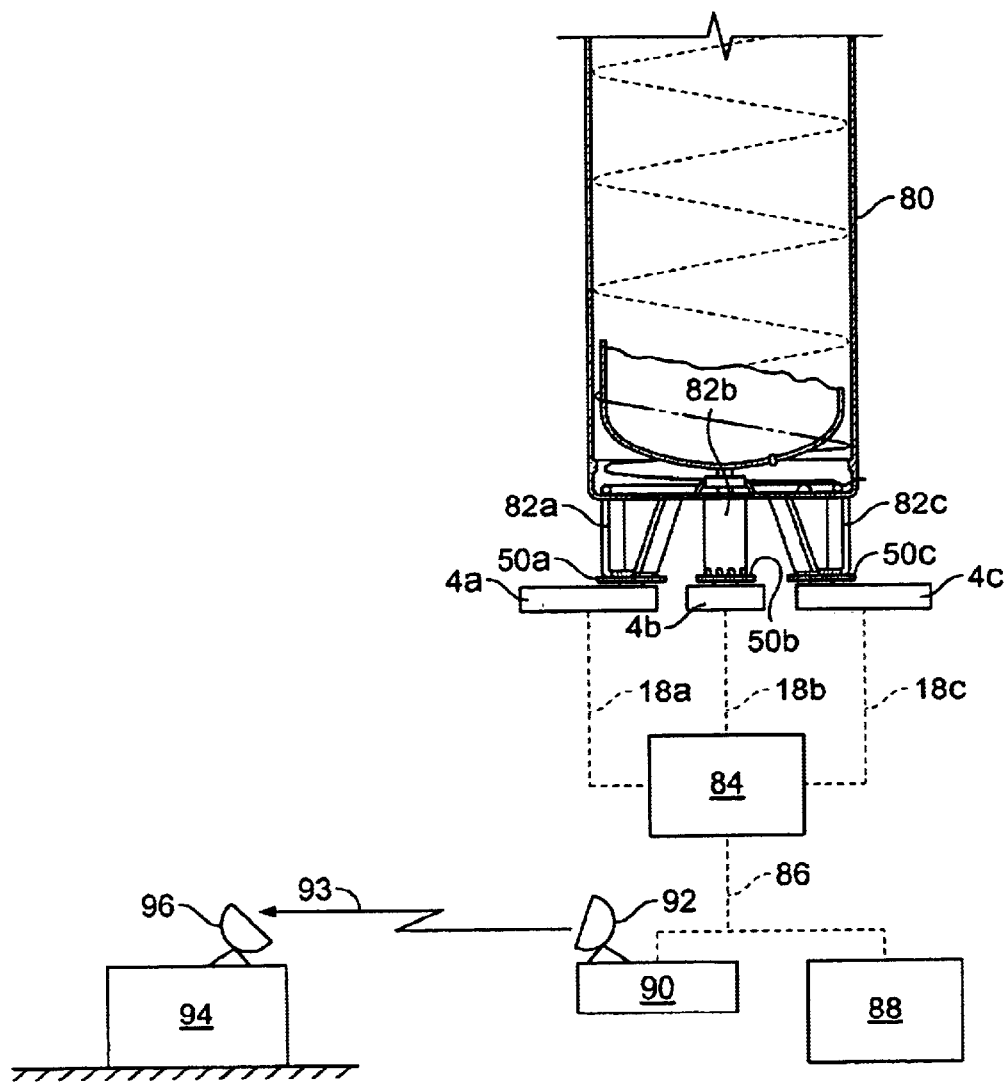
FIG. 3 is a schematic diagram of a weighing system incorporating the load cell of FIGS. 1 and 2.

In accordance with the present invention, a number of load cells of the type illustrated in FIG. 2 may be used as part of a weighing system for cryogenic tanks, as illustrated in FIG. 3. Three load cells of the type illustrated in FIGS. 2, 4a, 4b and 4c, may be used to detect the liquid level within a cryogenic liquid storage tank, indicated at 80. As illustrated in FIG. 3, the cryogenic liquid storage tank 80, which contains a cryogenic liquid such as liquid carbon dioxide and features an appropriate pressure-building system, features three legs 82a, 82b and 82c. Leg 82a is bolted to the platform 50a of load cell 4a via a bolt that passes through holes 54, 48 and 14 of FIG. 1. Legs 82b and 82c are bolted to platforms 50b and 50c of load cells 4b and 4c in a similar fashion.

The output signals of load cells 4a, 4b and 4c, which are analog voltage outputs proportional to the load placed on the load cells, are directed to a summary board or summing and calibration circuitry 84 via wires 18a, 18b and 18c. The summary board 84 combines and processes the signals received from the load cells 4a, 4b and 4c and produces an output signal proportional to the weight of the tank 80 and its contents. Appropriate summary boards are well known in the art. The output signal of the summary board is directed via line 86 to a display device 88. Display device 88 may take the form of a computer or may merely be an LCD or LED digital display. Summary board 84 is calibrated with the tank free from liquid so that display device 88 indicates zero when the tank is empty. The weight, and thus quantity, of liquid in the tank is displayed on the display device 88 as a result.

As an alternative or supplement to display device 88, the output signal from the summary board 84 may be directed to a transmitter 90. Transmitter 90 may communicate with an antenna 92 so that the liquid level or quantity in the tank 80 may be transmitted as telemetry 93 to a centralized facility 94 that is equipped with an antenna 96, receiver and other data processing equipment.

The facility could dispatch a liquid carbon dioxide delivery truck to refill tank 80 when it became depleted. Indeed, the centralized facility could receive telemetry from a number of remote tank locations to provide a system for refilling tanks in a timely and efficient manner. Alternative data transmission arrangements, such as land lines, could be substituted for the remote transmitter, centralized receiver and associated antennas of FIG. 3.

While three load cells are illustrated in FIG. 3, dummy load cells may be substituted for one or two of the load cells with only two or one, respectively, of the remaining active load cells providing data to the summary board 84. Such an arrangement would provide the stability of the multiple-load cell system described above while reducing equipment and potential maintenance costs. In such an arrangement, the summary board 84 would have to take into consideration the positioning of the active load cell(s) with respect to the tank.

The load cell and weighing system of the present invention thus offers many advantages. By suspending the beam from the top of the load cell frame, the floor underneath the load cell may be cleaned. This is a big positive in the restaurant industry. The load cell also is constructed from a minimum of parts. In particular, the one-piece frame simplifies construction. As a result, the load cell of the present invention is economical to construct and requires minimal maintenance.

In addition, the system illustrated in FIG. 3 allows the tank to be mounted to the load cell(s) in a secure and stable fashion. As a result, the system is effective even if the surface to which the load cells are mounted, such as the floor of a restaurant kitchen, is not level. Mounting of a tank leg to a load cell and mounting the load cells to a surface also is very simple in that one bolt only is required for each operation.

While the preferred embodiments of the invention have been shown and described, it will be apparent to those skilled in the art that changes and modifications may be made therein without departing from the spirit of the invention, the scope of which is defined by the appended claims.

What is claimed is:

1. A load cell for determining the weight of an object featuring at least one leg comprising:
 a) a frame having a top panel, said frame adapted to be positioned upon a surface with the top panel spaced from the surface;
 b) a beam having a proximal end portion and a distal end portion, said beam attached to the top panel of said frame by the proximal end portion in a generally horizontal orientation so that the distal end is suspended;
 c) a strain gauge circuit attached to said beam between the proximal and distal end portions;
 d) the distal end portion of said beam adapted to support the object; and
 e) means for securing the leg of the object to the distal end portion of said beam.

2. The load cell of claim 1 wherein said frame includes sides and ends that are adapted to support the top panel above the surface.

3. The load cell of claim 2 where said frame is constructed from a folded metal plate.

4. The load cell of claim 1 further comprising a spacer positioned between the proximal end of the beam and the top panel of the frame.

5. The load cell of claim 1 further comprising a platform attached to the distal end of the beam.

6. The load cell of claim 5 further comprising a platform support positioned between the platform and the distal end of the beam.

7. The load cell of claim 6 wherein the top panel of said frame includes an opening formed therein through which the platform support passes so that the platform is supported above the top panel of the frame.

8. The load cell of claim 1 further comprising a floor-mount hole formed through the top panel of the frame, the floor-mount hole adapted to receive a bolt which may be positioned there through and in engagement with the surface upon which the load cell is positioned.

9. The load cell of claim 1 wherein said beam includes a top surface and the strain gauge circuit is attached to the top surface of the beam.

10. A system for weighing an object having a plurality of legs comprising:
 a) a plurality of load cells, each including:
  i) a frame having a top panel, said frame adapted to be positioned upon a surface with the top panel spaced from the surface;
  ii) a beam having a distal end portion and a proximal end portion, said beam attached to the top panel of said frame by the proximal end portion in a generally horizontal orientation so that the distal end is suspended;
  iii) said distal end of said beam adapted support one of said plurality of legs of the object and including means for securing the leg to the distal end;
  iv) a strain gauge circuit attached to said beam between said proximal and distal end portions;
 b) one each of said plurality of load cells positioned between one each of the plurality of legs and the surface;
 c) the strain gauge circuits of each of said plurality of load cells in communication with an electrical device;
 whereby the electrical device determines the weight of the object via signals received from the plurality of load cells.

11. The system of claim 10 wherein the object is a tank containing a liquid and the electrical device determines a quantity of liquid within the tank based upon the weight of the tank.

12. The system of claim 11 wherein the liquid is liquid carbon dioxide.

13. The system of claim 11 further comprising a transmitter in communication with the electrical device and an antenna in communication with the transmitter so that the quantity of liquid in the tank may be transmitted to a centralized facility.

14. The system of claim 10 wherein the electrical device includes summing and calibration circuitry.

15. The system of claim 10 wherein said electrical device includes a display device.

16. The system of claim 10 wherein the frames of the load cells are adapted to be secured to the surface and the distal ends of the load cell beams are adapted to be secured to the legs of the object.

17. The system of claim 16 wherein bolts are used to secure the load cell frames to the surface and the legs of the object to the distal ends of the load cell beams.

18. A tank system comprising:
 a) a tank containing a quantity of liquid, said tank supported by a plurality of legs;
 b) a load cell position under each leg, each load cell including:
  i) a frame having a top panel, said frame adapted to be positioned on a surface with the top panel spaced from the surface;

ii) a beam having a distal end portion and a proximal end portion, said beam attached to the top panel of said frame by the proximal end portion in a generally horizontal orientation so that the distal end is suspended;

iii) said distal end of said beam adapted to support one of said plurality of legs of the object and including means for securing the leg to the distal end;

iv) a strain gauge circuit attached to said beam between said proximal and distal end portions;

c) the strain gauge circuits of each of said plurality of load cells in communication with an electrical device;

whereby the electrical device determines the quantity of liquid within the tank via signals received from the plurality of load cells.

19. The tank of claim 18 wherein the liquid is liquid carbon dioxide.

20. The system of claim 19 further comprising a transmitter in communication with the electrical device and an antenna in communication with the transmitter so that the quantity of liquid carbon dioxide in the tank will be transmitted to a centralized facility.

21. A load cell for determining the weight of an object comprising:

a) a frame having a top panel, said frame adapted to be positioned upon a surface with the top panel spaced from the surface, and a floor-mount hole formed through the top panel of the frame, the floor-mount hole adapted to receive a bolt which is positioned there through and engagement with the surface upon which the load cell is positioned;

b) a beam having a proximal end portion and a distal end portion, said beam suspended from the top panel of said frame by the proximal end portion;

c) a strain gauge circuit attached to said beam between the proximal and distal end portions; and d) the distal end portion of said beam adapted to support the object.

22. A system for weighing a tank containing liquid carbon dioxide and having a plurality of legs comprising:

a) a plurality of load cells, each including:

i) a frame having a top panel, said frame adapted to be positioned upon a surface with the top panel spaced from the surface;

ii) a beam having a distal end portion and a proximal end portion, said beam suspended from the top panel of said frame by the proximal end portion;

iii) said distal end of said beam adapted support one of said plurality of legs of the tank;

iv) a strain gauge circuit attached to said beam between said proximal and distal end portions;

b) one each of said plurality of load cells positioned between one each of the plurality of legs and the surface;

c) the strain gauge circuits of each of said plurality of load cells in communication with an electrical device;

whereby the electrical device determines a quantity of liquid carbon dioxide in the tank based upon the weight of the tank via signals received from the plurality of load cells.

23. A tank system comprising:

a) a tank containing a quantity of liquid carbon dioxide, said tank supported by a plurality of legs;

b) a load cell position under each leg, each load cell including:

i) a frame having a top panel, said frame adapted to be positioned on a surface with the top panel spaced from the surface;

ii) a beam having a distal end portion and a proximal end portion, said beam suspended from the top panel of said frame by the proximal end portion;

iii) said distal end of said beam adapted to support one of said plurality of legs of the tank;

iv) a strain gauge circuit attached to said beam between said proximal and distal end portions;

c) the strain gauge circuits of each of said plurality of load cells in communication with an electrical device;

whereby the electrical device determines the quantity of liquid carbon dioxide within the tank via signals received from the plurality of load cells.

* * * * *